Feb. 10, 1931.  O. B. CRAMER  1,792,002
BABY CARRY CART
Filed Nov. 30, 1929  2 Sheets-Sheet 1
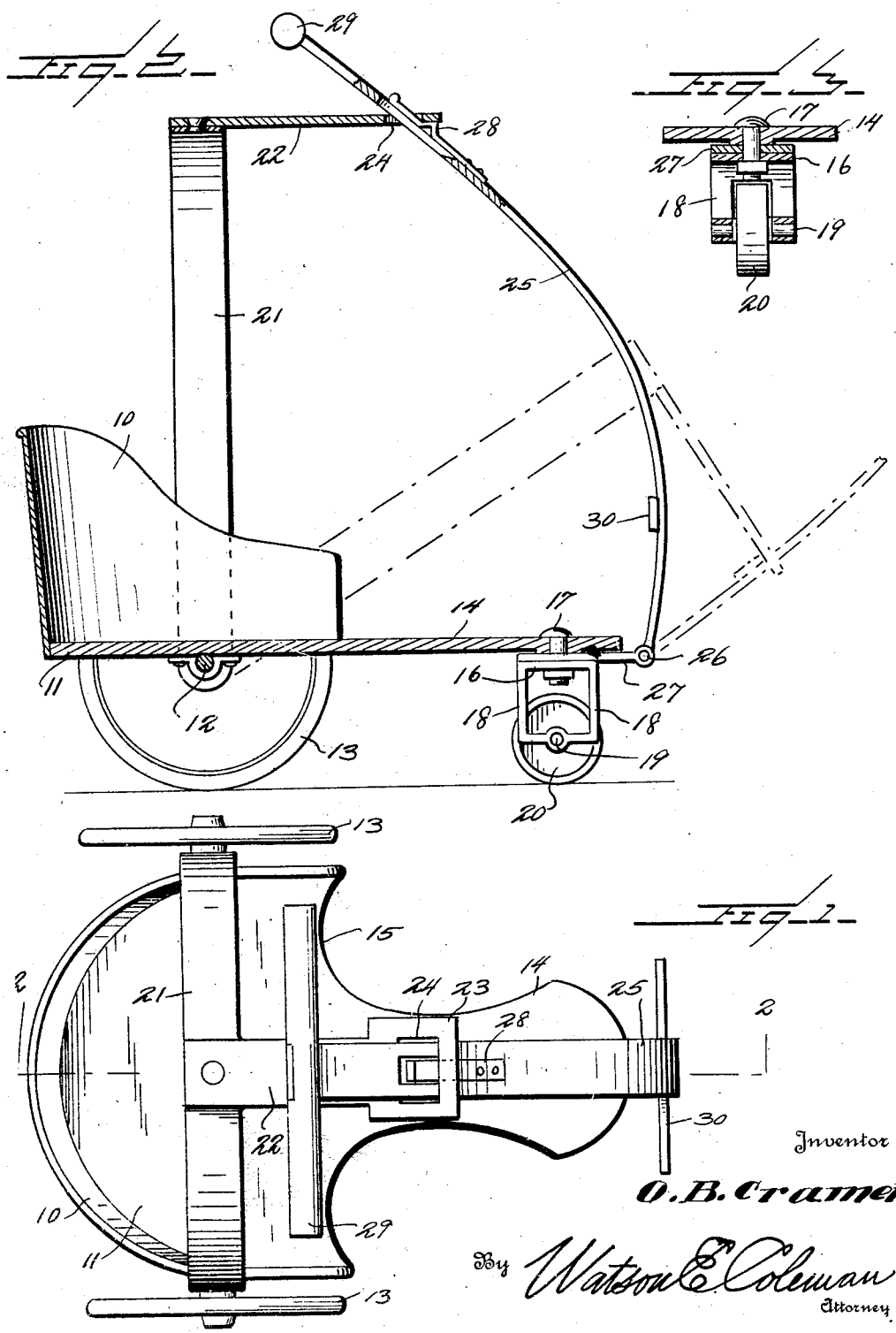

Feb. 10, 1931.    O. B. CRAMER    1,792,002
BABY CARRY CART
Filed Nov. 30, 1929    2 Sheets-Sheet 2
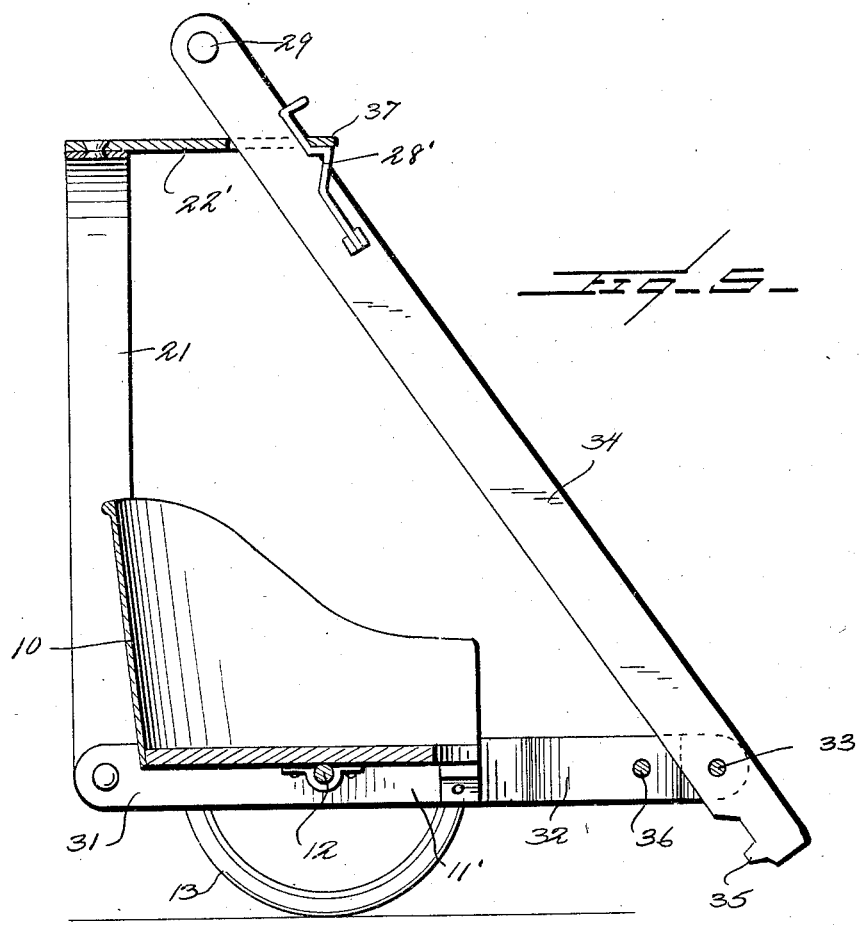
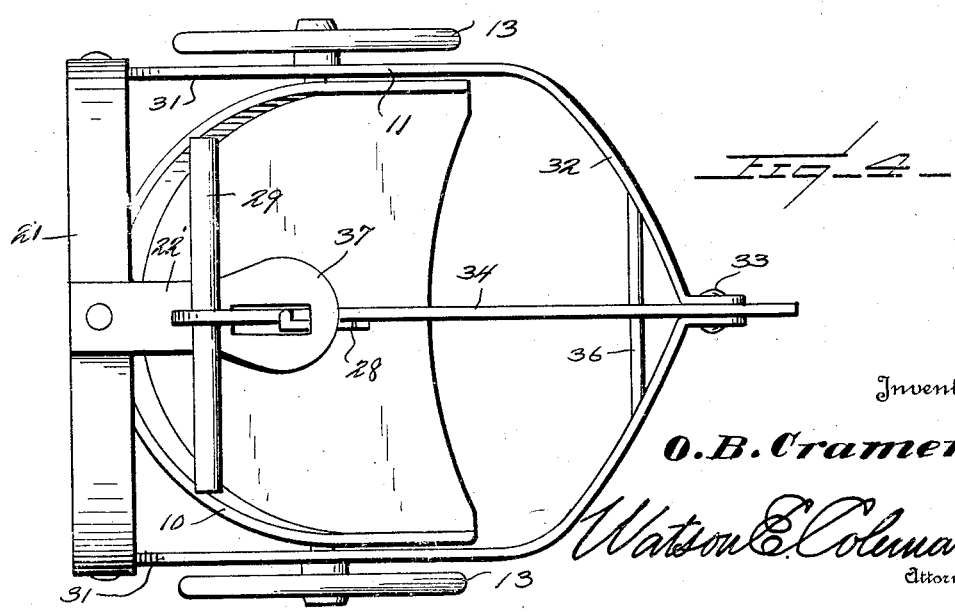
Inventor
O. B. Cramer
Watson E. Coleman
Attorney Patented Feb. 10, 1931

1,792,002

UNITED STATES PATENT OFFICE

OLIVE B. CRAMER, OF STERLING, COLORADO

BABY CARRY CART

Application filed November 30, 1929. Serial No. 410,803.

The present invention relates to baby carry carts and more particularly to baby carts or carriages of the pull type.

An object of this invention is to provide a baby cart which is light and simple in construction so that it may be easily lifted or carried without disturbing the occupant.

Another object of this invention is to provide a device of this character wherein a pivoted bail is secured to the body, the bail carrying handle means for slidably engaging the pull rod or shaft.

A further object of this invention is to provide a device of this character which may be readily adapted for use in vehicles of various types and configurations having two or more wheels.

A still further object of this invention is to provide a device of this character with suitable latch or locking means for holding the bail in substantially upright position so as to facilitate the carrying or lifting of the vehicle.

The above and various other objects and advantages of this invention will in part be described in and in part understood from the following detailed description of the present preferred embodiment, the same being illustrated in the accompanying drawing wherein:—

Fig. 1 is a detail top plan view of a preferred embodiment of the present invention;

Fig. 2 is a longitudinal section taken substantially on the line 2—2 of Fig. 1;

Fig. 3 is a transverse section partly in elevation of the front wheel and supporting framework;

Fig. 4 is a detail top plan view of a modification; and

Fig. 5 is a longitudinal section taken substantially through the middle of the device.

Referring to the drawing wherein like numerals designate corresponding parts throughout the drawing, the numeral 10 designates a body structure of any suitable type or configuration which is mounted on a chassis or frame structure 11.

The frame 11 is provided adjacent the rear end thereof with a transversely mounted axle 12 on which are rotatably mounted the conventional type of wheels 13 or the like. The base or frame 11 is provided with a forward extension 14 which extends outwardly and forwardly of the body 10, the extension 14 being of a restricted or reduced construction so as to permit the limbs of an infant or the like to depend from the base 11.

The inner end portion of the extension 14 is preferably curved outwardly as at 15 so that an infant or the like may conveniently sit in the seat or body 10 and project its legs outwardly of the seat so as to freely swing on opposite sides of the extension 14 and propel the device with its feet.

A pivoted frame 16 is mounted on the forward end of the extension 14 by means of a pivot 17 or the like, the lower end of the frame 16 having a pair of depending spaced members 18. An axle 19 is mounted in the spaced members 18 in any suitable manner, and a reduced front wheel 20 is loosely mounted on the axle 19.

The bail 21 is pivotally mounted at the opposite ends thereof on the rear axle 12 and is provided with an outwardly and forwardly extending pivoted handle member 22 which is preferably mounted adjacent the upper end portion of the bail.

The handle 22 is adapted to extend forwardly of the bail 21 and is provided with an enlarged outer end portion 23 which is provided with an elongated slot 24 therethrough. A pulling handle or bar 25 is hingedly mounted at 26 on a forwardly extending member 27 which may be secured in any desired manner on the pivoted frame 16 so that the pivoted frame may be turned on its pivot 17 by the pull bar 25.

The pull bar 25 is preferably arcuately inclined, and spaced inwardly from the outer end thereof is provided with a locking or latching member 28 which is adapted to engage the loop 24 of the handle 22 so as to hold the tongue or pull bar 25 in substantially upright position.

The tongue member 25 may be provided with a laterally disposed grasping member 29 adjacent the outer end thereof so as to facilitate pulling of the vehicle. The tongue 25 is also provided spaced outwardly from the inner end thereof with a grasping or handle member 30 which is adapted to engage the handle 22 when the tongue is inclined forwardly in pulling position and which may be grasped in the hands when the vehicle is being propelled by the occupant. It will, of course, be understood that this vehicle may be constructed of any suitable material such as metal, wood or the like.

When it is desired to pull the vehicle, the tongue 25 may be released from the handle 22 by means of the latching member 28, and the upper end of the tongue swung forwardly thereby coactively swinging the bail forwardly and downwardly and the enlarged forward end of the handle 22 striking the stop 30 on the tongue 25. The outer end 29 of the tongue 25 will then be free to be grasped, and the vehicle may be readily pulled forwardly in the usual manner.

When it is desired to carry the vehicle in the hand, the bail 21 may be swung upwardly in substantially vertical position thereby coactively swinging the tongue 25 upwardly and rearwardly and causing the latching member 28 to engage the looped end of the handle for holding the tongue upright. The handle 22 may then be grasped and the vehicle moved about or lifted as desired.

In the modification of this device, as shown in Figs. 4 and 5, the body 10 is provided with a pair of wheels 13 which are mounted on an axle 12. The frame 11' of the modification is preferably extended rearwardly as at 31, and the bail 21 is pivotally mounted adjacent the rear end of the frame members 11'.

The frame members 11' may be bent inwardly at their forward ends as at 32, and a pivot or bolt 33 is adapted to hold the outer ends of the frame together.

A tongue member 34 is carried by the pivot 33 and the inner end of the tongue 34 is provided with a latching member 35 which is adapted to engage a latch bar 36, or the like, which is interposed between the frame members 11' spaced rearwardly of the forward ends thereof.

The bail 21 is provided with a forwardly extending handle member 22' which is provided with an apertured or looped forward end 37 which is adapted to slidably engage the tongue 34. A latch 28' or the like may be mounted on the tongue 34 spaced downwardly from the upper end thereof and, if desired, a handle or grasping means 29 may be secured to the outer or upper end of the tongue 34.

It will of course be noted from the foregoing that this device may be applied to various types of baby carriages or vehicles, and that various changes and modifications may be made in the details of construction and design of the above specifically described embodiment of the invention without departing from the spirit thereof, such changes and modifications being restricted only by the scope of the following claims.

What is claimed is:—

1. A baby carry cart of the character described, comprising a body structure, a plurality of wheels rotatably mounted on said body structure, a bail rockably secured to said body structure, a handle mounted on said bail and extending forwardly therefrom, and a tongue hingedly mounted on said body and adapted to engage said handle.

2. A baby carry cart of the character described, comprising a body, a frame for said body, wheels rotatably mounted on said frame, a bail rockably secured to said frame and extending outwardly of said body, a handle mounted on said bail and extending forwardly therefrom, a tongue hingedly mounted on said frame, and latch means for holding said tongue in engagement with said handle.

3. A baby carry cart of the character described, comprising a body structure, a plurality of wheels pivotally mounted on said body, a bail pivotally secured to said body, handle means mounted on said bail and extending forwardly therefrom, said handle having an enlarged slotted forward end, a tongue hingedly secured to said body and adapted to slidably engage said handle in said slotted portion, latch means mounted spaced rearwardly from the forward end of said tongue for holding the tongue in fixed upward position on said handle, and grasping means positioned on said tongue spaced outwardly from the inner end thereof, said grasping means being adapted to engage said handle when the bail has been swung downwardly and forwardly.

4. A carry cart of the character described, comprising a body, a pair of wheels mounted on said body adjacent the rear end thereof, a wheel pivotally secured to said body adjacent the forward end thereof, a bail pivotally mounted on said body adjacent the rear end thereof and adapted to extend upwardly from said body, a handle pivotally mounted on said bail adjacent the upper end portion thereof and extending forwardly of the bail, said handle being provided with an enlarged end portion having a slotted opening therethrough, a tongue hingedly mounted at its inner end on said body and being adapted to slidably engage said handle through said slotted portion thereof, locking means mounted on said tongue spaced rearwardly of the forward end, grasping means mounted on said tongue spaced outwardly from the inner end thereof and adapted to engage said handle when the bail has been swung forwardly and downwardly.

5. A carry cart of the character described, comprising a body, an axle transversely mounted on said body adjacent the rear end thereof, a pair of wheels loosely mounted on said axle, a bail pivotally mounted on said axle and extending upwardly therefrom, a handle pivotally secured to said bail, said handle having an apertured forward end, an arcuately inclined tongue hingedly mounted on said body, said tongue being adapted to slidably engage said handle in said apertured portion thereof, latching means on said tongue whereby to engage the handle for holding the tongue in substantially upright position, and grasping means mounted on said tongue adjacent the inner end thereof for engaging said handle when the bail has been swung forwardly whereby to limit the movement of said bail.

In testimony whereof I hereunto affix my signature.

OLIVE B. CRAMER.